(12) United States Patent
Weber

(10) Patent No.: US 9,534,627 B2
(45) Date of Patent: Jan. 3, 2017

(54) BEARING ARRANGEMENT HAVING A BEARING SOCKET

(71) Applicant: Webasto-Edscha Cabrio GmbH, Stockdorf (DE)

(72) Inventor: Albert Weber, Heimhart (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 387 days.

(21) Appl. No.: 14/048,121

(22) Filed: Oct. 8, 2013

(65) Prior Publication Data

US 2014/0099156 A1 Apr. 10, 2014

(30) Foreign Application Priority Data

Oct. 9, 2012 (DE) .................. 10 2012 109 596

(51) Int. Cl.
| | | |
|---|---|---|
| *F16C 11/04* | (2006.01) | |
| *F16B 21/07* | (2006.01) | |
| *B60J 7/12* | (2006.01) | |
| *B60J 1/18* | (2006.01) | |

(52) U.S. Cl.
CPC .............. *F16C 11/04* (2013.01); *B60J 1/1815* (2013.01); *B60J 7/1204* (2013.01); *F16B 21/075* (2013.01); *Y10T 403/32606* (2015.01)

(58) Field of Classification Search
CPC ....... F16B 21/075; F16B 9/023; F16B 13/128; B60J 1/18; B60J 1/1807; B60J 1/1815; B60J 1/1823; Y10T 403/40; Y10T 403/405; Y10T 403/32983; Y10T 403/606; Y10T 403/398; Y10T 403/7039; Y10T 403/4642; Y10T 403/3913; Y10T 24/42; Y10T 24/44026; Y10T 24/01; F16C 11/04

See application file for complete search history.

(56) References Cited

U.S. PATENT DOCUMENTS

| | | | |
|---|---|---|---|
| 2,943,373 A | 7/1960 | Rapata | |
| 3,203,304 A | 8/1965 | Rapata | |
| 3,385,157 A | 5/1968 | Rapata | |
| 3,991,446 A | 11/1976 | Mooney et al. | |
| 4,208,075 A | 6/1980 | Templeton | |
| 4,506,419 A * | 3/1985 | Mitomi .................. | F16B 21/02 24/289 |

(Continued)

FOREIGN PATENT DOCUMENTS

| | | |
|---|---|---|
| DE | 960045 C | 3/1957 |
| DE | 1400846 A1 | 3/1969 |

(Continued)

*Primary Examiner* — Joshua Kennedy
(74) *Attorney, Agent, or Firm* — Quarles & Brady LLP

(57) ABSTRACT

A bearing arrangement includes a carrier device and a bearing socket for rotatably supporting a component. The bearing socket includes a sleeve fixed in a recess of the carrier device. A peripheral wall of the sleeve delimits an inner space for receiving a bearing journal of a component. The sleeve includes at least a first, inner catch element securing the bearing journal in the sleeve and a second, outer catch element securing the sleeve in the recess of the carrier device. The second catch element is formed from a catch tongue which is a portion of the peripheral wall of the sleeve and which has a hooked portion for engagement in a catch receiving member of the recess of the carrier device.

19 Claims, 6 Drawing Sheets

(56) References Cited

U.S. PATENT DOCUMENTS

| | | | | |
|---|---|---|---|---|
| 4,952,106 A * | 8/1990 | Kubogochi | ......... | F16B 19/1081 411/48 |
| 5,047,904 A * | 9/1991 | Vraux | ...................... | B60Q 1/06 362/273 |
| 5,127,762 A * | 7/1992 | Havlovitz | ................. | B62B 5/06 403/108 |
| 5,651,632 A * | 7/1997 | Gordon | .................. | F16B 21/06 24/662 |
| 5,850,676 A * | 12/1998 | Takahashi | ........... | B60R 13/0206 24/297 |
| 6,116,807 A * | 9/2000 | Dzurko | .................. | E05B 79/12 403/164 |
| 6,467,965 B1 | 10/2002 | Wyer | | |
| 6,507,976 B2 * | 1/2003 | Ichimaru | ................ | E05F 5/022 16/2.1 |
| 6,837,716 B1 * | 1/2005 | Brazas | ..................... | B60Q 1/06 403/122 |
| 7,575,390 B2 * | 8/2009 | Yanagita | ................ | F16F 9/0227 24/297 |
| 8,322,001 B2 * | 12/2012 | Ehrhardt | ............. | B60R 13/0206 24/289 |
| 2013/0055548 A1 * | 3/2013 | Burton | ................. | B60Q 1/2626 29/525.03 |
| 2014/0093325 A1 * | 4/2014 | Mizukoshi | ............ | F16B 13/063 411/45 |

FOREIGN PATENT DOCUMENTS

| | | |
|---|---|---|
| DE | 7838228 U1 | 3/1979 |
| DE | 19716992 C1 | 11/1998 |
| DE | 10039808 A1 | 2/2002 |
| EP | 2192311 A2 | 6/2010 |
| GB | 1034865 | 7/1966 |
| GB | 1091673 A | 11/1967 |

* cited by examiner

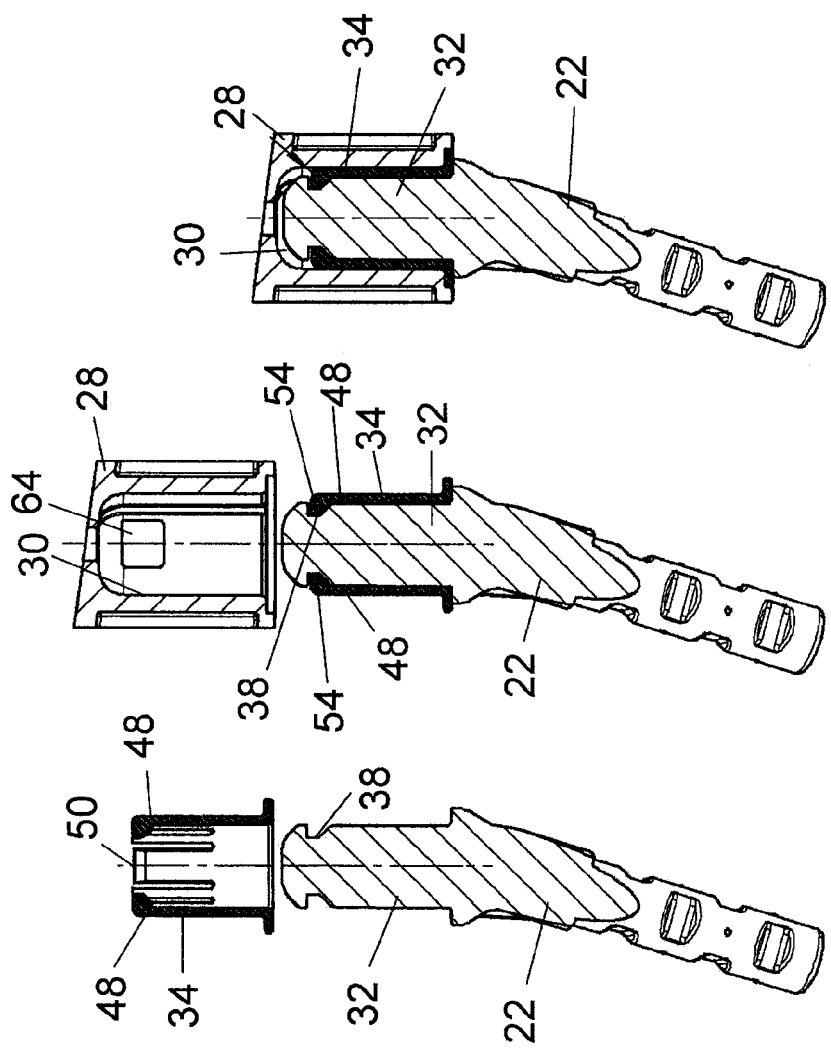

BEARING ARRANGEMENT HAVING A BEARING SOCKET

CROSS REFERENCE TO RELATED APPLICATION

This application claims the priority benefit of German Patent Application No. 10 2012 109 596.5 filed on Oct. 9, 2012, which is fully incorporated herein by reference.

STATEMENT REGARDING FEDERALLY SPONSORED RESEARCH OR DEVELOPMENT

Not applicable.

FIELD OF THE INVENTION

The invention relates to a bearing arrangement having a bearing socket.

BACKGROUND OF THE INVENTION

In practice, it is known to pivotably support components on a carrier device by means of a bearing socket. For example, in the case of folding roofs of cabriolet vehicles, it may be necessary to pivotably support a rigid rear window on a rear window connection rod of a roof rod assembly. In this instance, a rear window frame forms a carrier device in which an end-face bearing journal of the rear window connection rod rotatably or pivotably engages. For support, it is possible to use a flanged socket which is arranged in a recess of the rear window frame. The resulting bearing shaft may be secured by means of a securing plate or a screw. It is also known to clip-fit components in a blind hole. However, this involves the risk that the clip-fitting becomes disengaged in an undesirable manner as a result of any forces which may occur so that the bearing journal can be pulled out of the recess again. There is also the risk of the clip-fitting breaking.

In order to secure bearing locations, there is further known a securing clip, by means of which the rotatably supported component is secured in the bearing location.

It is further known to secure bearing locations by means of a rivet. However, this has the disadvantage that destruction-free disassembly is not possible.

SUMMARY OF THE INVENTION

An object of the invention is to provide a bearing arrangement having a bearing socket which enables rotatable support of a component on a carrier element and which can be assembled in a simple manner.

According to the invention, there is therefore proposed a bearing arrangement having a bearing socket for rotatably supporting a component on a carrier device which comprises a sleeve which is fixed in a corresponding recess of the carrier device and which delimits with a peripheral wall an inner space for receiving a bearing journal of the component. The sleeve comprises at least a first, inner catch element which secures the bearing journal in an axial direction in the sleeve and a second, outer catch element which secures the sleeve in an axial direction in the recess of the carrier device.

The second catch element is formed from a catch tongue which is a portion of the peripheral wall of the sleeve and which has a hooked portion for engagement in a catch receiving member of the recess of the carrier device.

In order, on the one hand, to be able to assemble or also disassemble once more the component which is intended to be rotatably supported or the bearing journal of the component, which bearing journal is provided with the bearing socket, in the recess of the carrier device in a simple manner and, on the other hand, to prevent undesirable release of the bearing socket from the recess of the carrier device, the bearing journal has at the periphery thereof at least one assembly and disassembly recess which, when arranged below the catch tongue of the sleeve, releases the sleeve with respect to actuation and an assembly or disassembly of the sleeve on the carrier device or from the carrier device and which, when rotated with respect to the catch flap, blocks it with respect to an actuation. The assembly and disassembly recess thus constitutes a local recess of the bearing journal, in which the catch tongue can be pressed for assembly or disassembly. When the assembly and disassembly recess is rotated with respect to the catch tongue and the catch tongue is in abutment against an at least partially cylindrical outer face of the bearing journal, actuation of the catch tongue is blocked. Consequently, undesirable release of the bearing socket from the carrier device can be blocked. The position of the bearing journal which is rotated with respect to the catch tongue corresponds to an operating position, whereas the assembly or disassembly position occurs when the catch tongue and the assembly and disassembly recess are aligned with each other.

The bearing socket is clip-fitted to or engaged with both the bearing journal of the component and the carrier device. In order to support the component with the bearing journal on the carrier device, there is consequently required only a single component which is formed by the bearing socket itself. As a result of the engagement of the sleeve on the bearing journal and the carrier device, the bearing journal is arranged in the recess of the carrier device so as to be secured against being withdrawn. The recess of the carrier device is, for example, constructed as a blind hole, with the bearing journal of the component being pushed in a simple manner into the recess during assembly so that the sleeve engages at that location, which bearing journal is provided with the bearing socket.

Simple manual assembly is consequently possible. Using the bearing socket, it is also possible to achieve separation between the carrier device and the component with the bearing journal which may be found to be advantageous, in particular with regard to any noise development and/or electrical decoupling.

In a preferred embodiment of the bearing according to the invention, the first catch element is formed from a catch flap which is a portion of the peripheral wall of the sleeve and which has at the end-face end thereof a catch projection for engagement in an annular groove of the bearing journal. The catch flap thus ensures that the bearing journal is secured against being pulled out of the bearing socket, with the rotation thereof in the bearing socket being able to be ensured at the same time by the engagement of the catch projection in the annular groove of the bearing journal.

In order to facilitate assembly, an advantageous embodiment of the bearing according to the invention has a catch flap having a catch projection which has, at the flank thereof facing away from the end-face end of the catch flap, an inclined starting member or ramp. Consequently, the bearing socket can be fitted in a simple manner to the bearing journal of the component to be supported, as far as a relative position in which the catch projection engages or snap-fits in the annular groove of the bearing journal.

In another advantageous embodiment of the bearing socket, the second element secures the sleeve in the recess of the carrier device in a rotationally secure manner.

The rotationally secure fixing of the sleeve in the recess of the carrier device may, for example, be carried out by the catch receiving member for the hooked portion of the catch tongue being an aperture cut-out of the recess of the carrier device whose width in the peripheral direction of the sleeve substantially corresponds to the width of the catch tongue.

In order to be able to secure the sleeve to the carrier device in a releasable manner, the aperture cut-out of the recess of the carrier device may extend through a wall of the carrier device so that the catch tongue is accessible manually through the aperture cut-out or also using a tool.

In order to facilitate assembly, in an advantageous embodiment the hooked portion has a ramp flank and a flank which is radial with respect to the axis of the sleeve. The ramp flank is arranged at the front or at the end face with respect to the insertion direction of the sleeve in the recess of the carrier device.

In order to be able to assemble the bearing socket with respect to the carrier device in a rotationally secure manner, the sleeve has a torsion prevention system in a preferred embodiment. The torsion prevention system is, for example, formed from an axial rib which is formed on the periphery of the sleeve and which is constructed for engagement in a corresponding axial groove of the recess of the carrier device. Such a rib can be produced in a simple manner, in particular when the bearing socket is produced from plastics material.

In order to achieve precise axial positioning of the bearing socket in the recess of the carrier device, in a preferred embodiment the sleeve has on the periphery thereof a stop for abutment against the carrier device. The stop is preferably formed by an annular collar.

The invention relates to a bearing arrangement which comprises a carrier device having a recess, a bearing socket of the above-described type and a component which is rotatably supported on the carrier device by means of the bearing socket.

The bearing arrangement may be realized in a motor vehicle, in particular a roof of a cabriolet vehicle. For example, the carrier device constitutes a frame of a rear window of the cabriolet roof, whereas the rotatably supported component is a rear window connection rod which is associated with a roof rod assembly of the roof. The rear window connection rod consequently has at the end thereof a bearing journal which is inserted via the bearing socket which is constructed in accordance with the invention in a recess of the rear window frame.

Other advantages and advantageous embodiments of the subject-matter of the invention can be derived from the description, the drawings and the patent claims.

BRIEF DESCRIPTION OF THE DRAWINGS

An embodiment of a bearing arrangement having a bearing socket is schematically illustrated in a simplified manner in the drawings, and is explained in greater detail in the following description. In the drawings:

FIG. 11 shows the bearing journal when the bearing socket is being fitted;

FIG. 12 shows the bearing journal with the bearing socket fitted during insertion into a recess of the articulation region of the rear window frame;

FIG. 13 shows the bearing journal mounted on the rear window frame;

DETAILED DESCRIPTION OF THE EXAMPLE EMBODIMENTS

Figure 1:
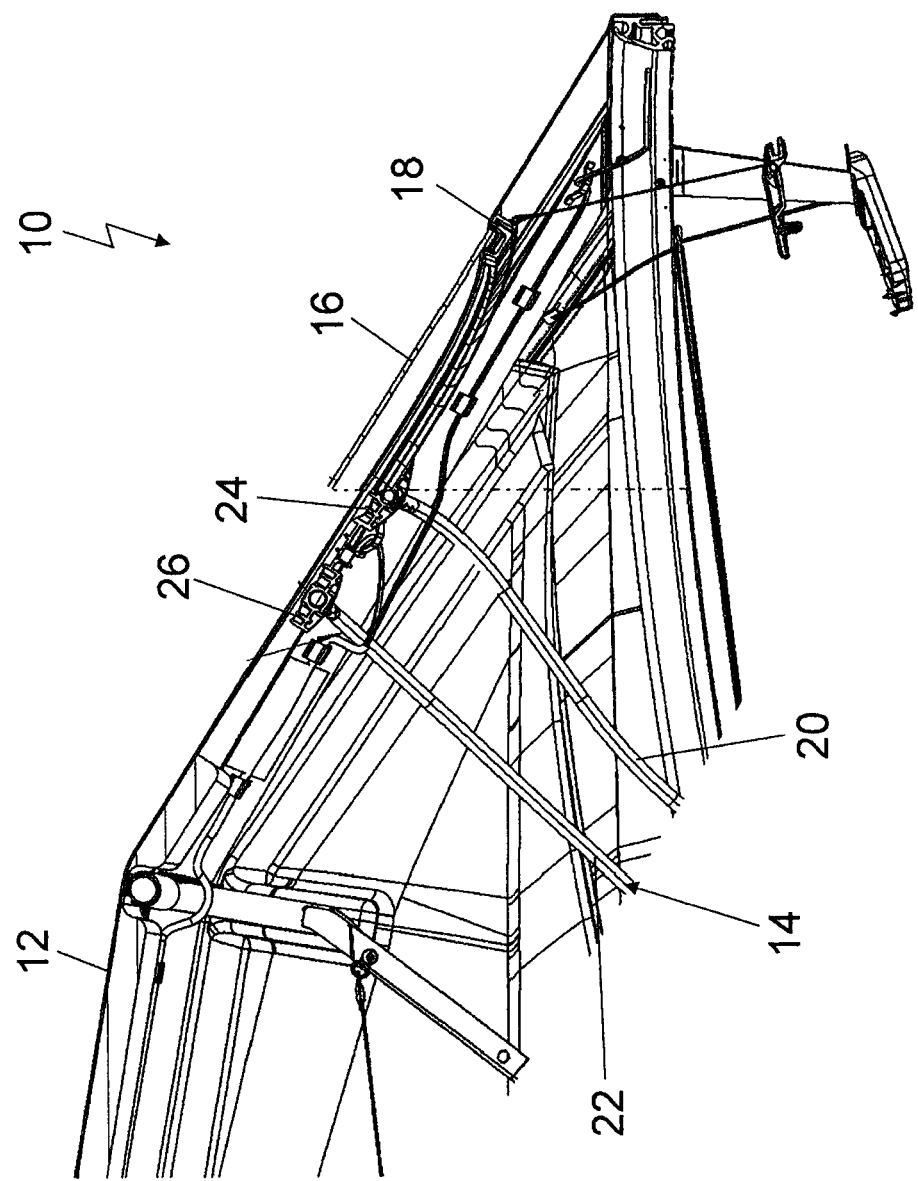
FIG. 1 is a sectioned cut-out of a cabriolet folding roof in the region of the rear window thereof.
Figure 2:
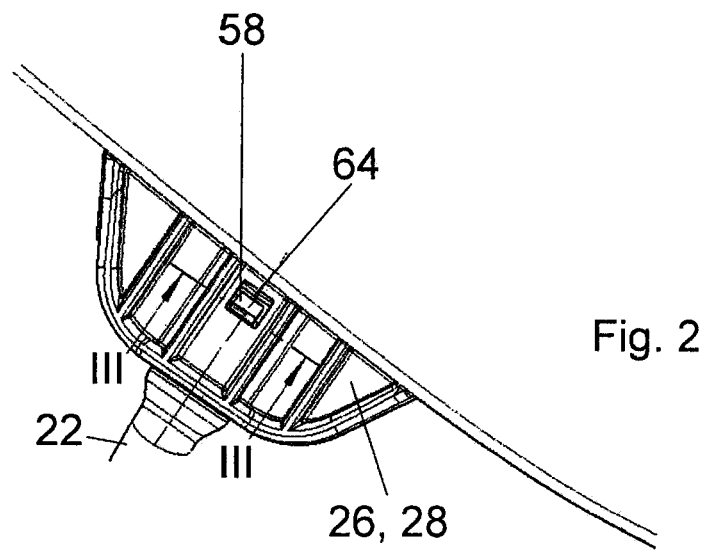
FIG. 2 is a side view of an articulation region of a frame of the rear window on a rear window connection rod.
Figure 3:
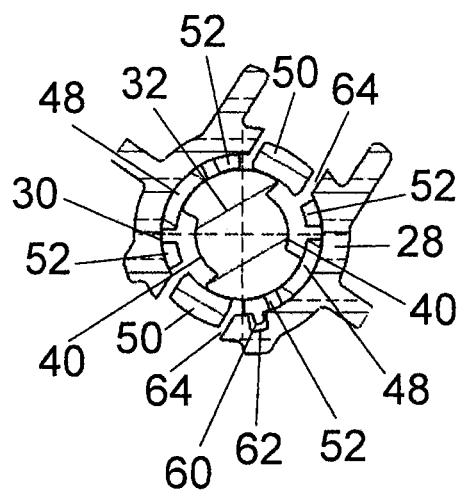
FIG. 3 is a section through the articulation region according to FIG. 2 along the line in FIG. 2.

FIG. 1 shows a folding roof 10 of a motor vehicle which is constructed as a cabriolet vehicle. The folding roof 10 can be adjusted between a closure position which is illustrated in FIG. 1 and which spans an inner space of the motor vehicle and a storage position which is not illustrated and in which the vehicle inner space is open in an upward direction and the folding roof 10 is stored in a rear-end storage region. The folding roof 10 comprises a roof cover 12 and a roof rod assembly 14 for tensioning and adjusting the roof cover 12.

In a portion which is arranged at the rear end with respect to the forward travel direction of the vehicle, the roof cover 12 delimits a rear window 16 which is provided with a rear window frame 18. With respect to a vertical vehicle longitudinal centre plane, two rear window connection rods 20 and 22 are articulated to the rear window frame 18 at both sides by means of a bearing region 24 and 26, respectively. The two bearing regions 24 and 26 are constructed in a comparable manner, for which reason only the bearing region 26 is described below.

The bearing region 26 is formed from a carrier portion 28 which is formed on the rear window frame 18 and which has a blind-hole recess 30, an end-face bearing journal 32 of the rear window connection rod 22 and a bearing socket 34, which is arranged with respect to the axis of the bearing journal 32 in a radial direction between the bearing journal 32 and the carrier portion 28. In the present case, the rear window connection rod 22 thus constitutes the component which is rotatably or pivotably supported on the carrier portion 28.

Figure 4:
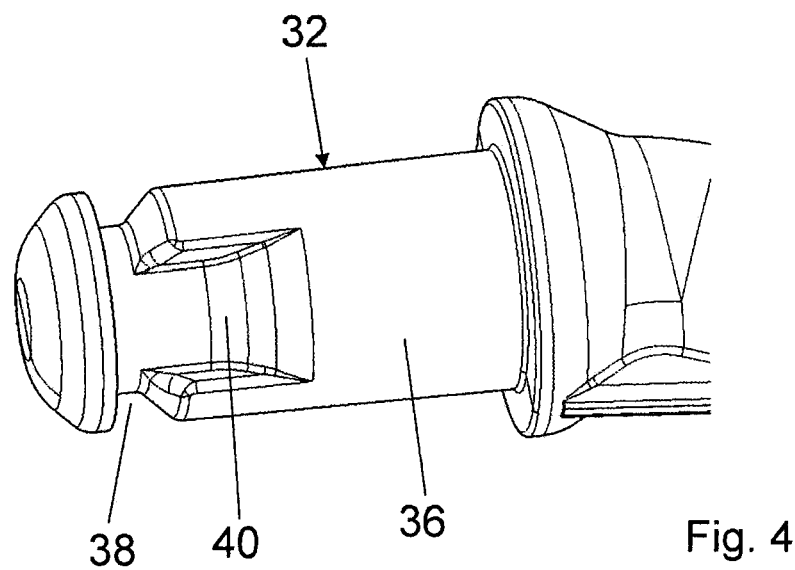
FIG. 4 is a perspective view of a bearing journal of the rear window connection rod.
Figure 5:
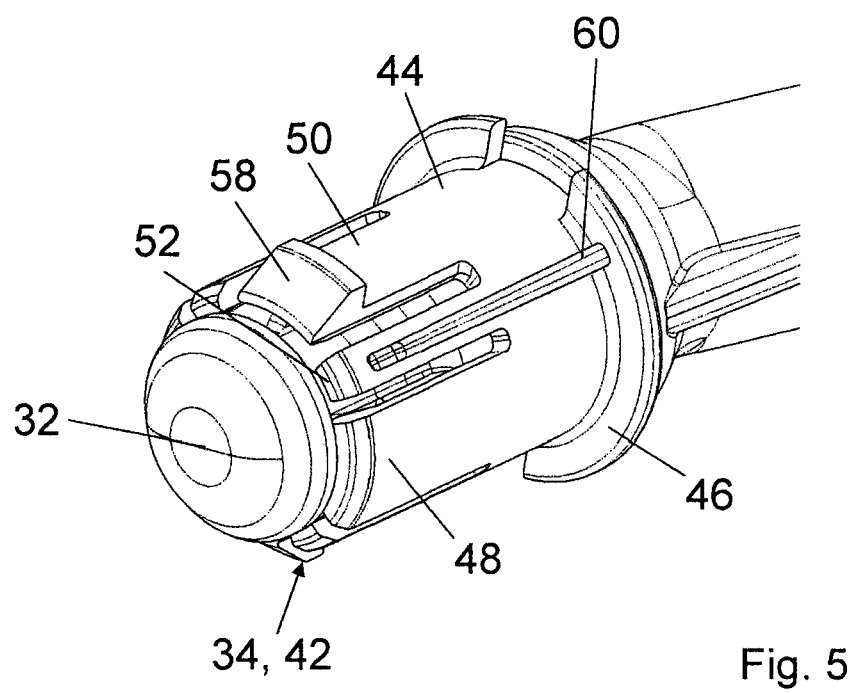
FIG. 5 is a perspective view of the bearing journal with the bearing socket fitted.
Figure 6:
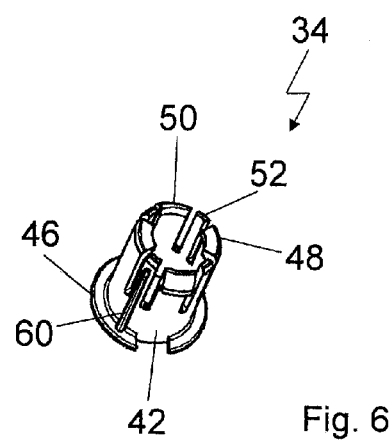
FIG. 6 is a perspective view of the bearing socket alone.
Figure 7:
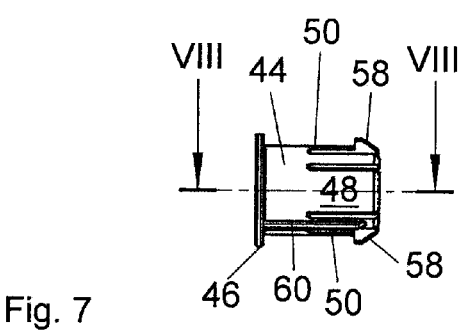
FIG. 7 is a first side view of the bearing socket.
Figure 8:
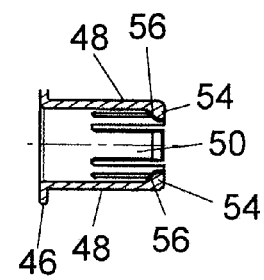
FIG. 8 is a section through the bearing socket along the line VIII-VIII in FIG. 7.
Figure 9:
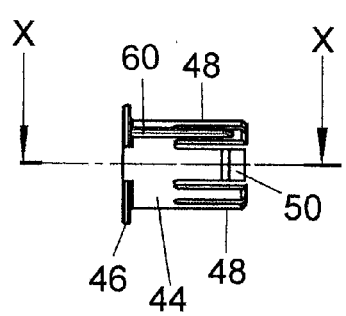
FIG. 9 is a second side view of the bearing socket, rotated through 90° with respect to the view in FIG. 7.
Figure 10:
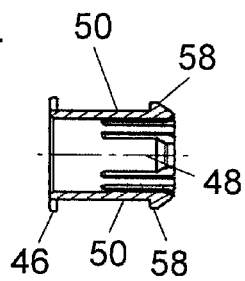
FIG. 10 is a section through the bearing socket along the line X-X in FIG. 9.

As can be seen from FIG. 4, the bearing journal 32 has a substantially cylindrical peripheral face, which merges into an annular groove 38 which is formed close to the end face of the bearing journal 32. Furthermore, there are formed on the peripheral face 36 of the bearing journal 32 two assembly and disassembly recesses 40, which each constitute a vessel recess of the bearing journal 32 and which are offset relative to each other through 180° in the peripheral direction of the bearing journal 32.

The bearing socket 34, which is illustrated alone in FIGS. 6 to 10, constitutes a plastics material injection-molded component, which is formed from a sleeve 42, which has a cylindrical base portion 44 which is continuous in a peripheral direction. On the one hand, the base portion 44 is delimited by an annular collar 46. At the side remote from the annular collar 46, the base portion 44 merges into two catch flaps 48 which are offset relative to each other through 180° in relation to the peripheral direction of the sleeve 42, into two catch tongues 50 which are also offset relative to each other through 180° in relation to the peripheral direction of the sleeve 42, and into four transition tongues 52, which are each arranged between the catch flaps 48 and catch tongues 50 and are separated from them by means of slots. The base portion 44, the catch flaps 48, the catch tongue 50 and the transition tongues 52 together form a peripheral wall of the sleeve 42.

The catch flaps 48 serve to fix the bearing socket 34 to the bearing journal 32 of the rear window connection rod 22 and have for this purpose in each case in the end-face end regions thereof a catch projection 54 which is directed radially in the direction of the sleeve axis and which, in the assembled state of the bearing socket 34, engages in the annular groove 38 of the bearing journal 32. The catch projection 54 has a first flank, which is constructed as a radial face with respect to the axis of the sleeve 42 and forms an end face of the sleeve 42. At the flank thereof which faces away from this end face, the catch projection 54 has an inclined introduction ramp 56. The shape of the catch projection 54 corresponds to the cross-section of the annular groove 38 of the bearing journal 32.

The catch tongues 50 have in each case in the end portions thereof facing away from the annular collar 46 a hooked portion 58 which protrudes outwards in a radial direction with respect to the axis of the sleeve 42. The hooked portions 58 each have a flank which faces away from the annular collar 46 and which is constructed in a ramp manner and a flank which faces the annular collar 46 and which is constructed as a radial face with respect to the axis of the sleeve 42.

There is further formed on the outer peripheral face of the sleeve 42 an axial rib 60 which extends from the annular collar 46 over the base portion 44 as far as a transition tongue 52 and in the assembled state engages in an axial grove 62, which is formed in the recess 30 of the carrier portion 28 of the rear window frame 18. The axial rib 60 consequently acts together with the axial groove 62 as a torsion prevention system for the bearing socket 34 with respect to the carrier portion 28.

The recess 30 of the carrier portion 28 of the rear window frame 18 comprises at the peripheral wall thereof two aperture cut-outs 64 in which one of the hooked portions 58 of the catch tongues 50 engages in the assembled state, respectively. In the peripheral direction, the aperture cut-outs 64 have a width which corresponds to the width of the hooked portions 58 in the peripheral direction of the sleeve 42. The bearing socket 34 consequently rests in the recess 30 in a rotationally secure manner. Furthermore, the catch tongues 50 are engaged in the aperture cut-outs 64 by means of the hooked portions 58 in each case in such a manner that the radial flanks of the hooked portions 58 abut an edge of the relevant cut-out 64 and the bearing socket 34 rests in the recess 30 so as to be secured against being pulled out.

The cut-outs 64 each extend through a wall of the carrier portion 28. Consequently, the hooked portions 58 are accessible from the outer side or can be actuated in the assembled state of the bearing socket 34.

The assembly of the bearing arrangement, which is formed from the carrier portion 28, the bearing socket 34 and the bearing journal 32, is described below with reference to FIGS. 11 to 15.

In a first assembly step, the bearing socket 34 is fitted on the bearing journal 32 so that the catch projections 54 of the catch flaps 48 snap-fit in the annular groove 38 of the bearing journal 32.

Subsequently, as required, the bearing socket 34 is moved with respect to the bearing journal 32 into a rotation position in which the catch tongues 50 are in alignment with the assembly and disassembly recesses 40 of the bearing journal 32. In this position, the catch tongues 50 can be pressed in the direction of the axis of the bearing journal 32.

In a following step, the bearing journal 32 is introduced with an assembled and positioned bearing socket 34 into the recess 30 of the carrier portion 28 in such a manner that the axial rib 60 is guided in the axial groove 62. In this instance, the catch tongues 50 are pressed into the assembly and disassembly recesses 40. As soon as the hooked portions 58 of the catch tongues 50 have reached the aperture cut-outs 64 of the recess 30, the catch tongues 50 are engaged over the hooked portions 58 as a result of the restoring capacity of the catch tongues 50 in a radial direction.

Figure 14:
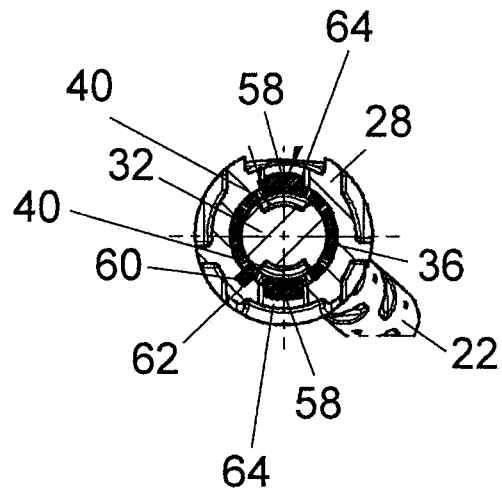
FIG. 14 is a section through the assembled bearing journal in an assembly or disassembly position.
Figure 15:
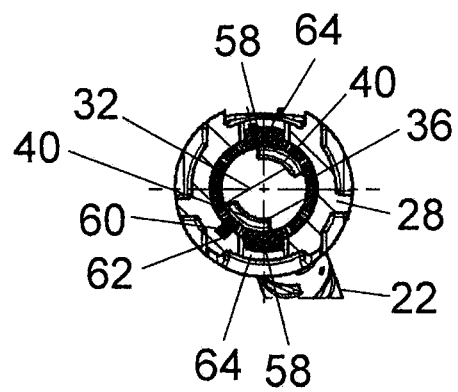
FIG. 15 is a section corresponding to FIG. 14, but in an operating position of the bearing journal with respect to the bearing socket.

Starting from the position illustrated in FIGS. 13 and 14, the rear window connection rod 20 and consequently the bearing journal 32 can be rotated with respect to the bearing socket which is arranged so as to be secured against being pulled out and in the recess 30 in a rotationally secure manner into the position which is illustrated in FIG. 15 and in which the assembly and disassembly recesses 40 of the bearing journal 32 are offset or rotated with respect to the catch tongues 50 in a peripheral direction. Consequently, the catch tongues 50 can no longer be pressed in the direction of the axis of the bearing journal 32 since they are directly in abutment against the bearing journal 32. Instead, the hooked portions 58 cannot be pressed in an undesirable manner out of the cut-outs 64, whereby a release of the bearing journal 32 from the carrier portion 28 would be possible. This can be achieved only by the bearing journal 32 again being rotated into the position which is illustrated in FIG. 14 and in which the catch tongues 50 can be pressed into the assembly and disassembly recesses 40 of the bearing journal 32 so that the hooked portions 58 can be moved out of the aperture cut-outs 64.

LIST OF REFERENCE NUMERALS

10 Folding roof
12 Roof cover
14 Roof rod assembly
16 Rear window
18 Rear window frame
20 Rear window connection rod
22 Rear window connection rod
24 Bearing region
26 Bearing region
28 Carrier portion
30 Recess
32 Bearing journal
34 Bearing socket
36 Peripheral face
38 Annular groove
40 Assembly and disassembly recesses
42 Sleeve
44 Base portion
46 Annular collar 48 Catch flap
50 Catch tongue
52 Transition tongues
54 Catch projection
56 Inclined starting ramp
58 Hooked portion
60 Axial rib
62 Axial groove
64 Cut-out

The invention claimed is:

1. A bearing arrangement, comprising
a carrier device; and
a bearing socket rotatably supporting a component on the carrier device, wherein the bearing socket includes a sleeve fixed in a corresponding recess of the carrier device and which delimits with a cylindrical peripheral wall an inner space for receiving a bearing journal of the component, wherein the sleeve includes at least a first, inner catch element securing the bearing journal in an axial direction in the sleeve and a second, outer catch element securing the sleeve in an axial direction in the recess of the carrier device, wherein the first catch element is formed from a catch flap forming a portion of the cylindrical peripheral wall of the sleeve and which has at an end-face end thereof a catch projection engaging an annular groove of the bearing journal, wherein the second catch element is formed from a catch tongue forming a portion of the cylindrical peripheral wall of the sleeve, said catch tongue having a hooked portion engaging the carrier device, a slot separating the catch elements such that the catch elements define free ends of the sleeve that can be independently flexed, wherein the bearing journal has at a periphery thereof at least one assembly and disassembly recess extending axially from the groove having a width in a peripheral direction at least substantially corresponding to a width of the catch tongue in a peripheral direction such that the catch tongue may be flexed inwardly into the at least one assembly and disassembly recess when the socket and bearing are inserted in the recess of the carrier device.

2. The bearing arrangement as claimed in claim 1, wherein the catch projection has an inclined starting ramp at a flank of the catch projection and facing away from an end-face end of the catch flap.

3. The bearing arrangement as claimed in claim 1, wherein the second catch element secures the sleeve in the recess of the carrier device in a rotationally secure manner.

4. The bearing arrangement as claimed in claim 1, wherein the hooked portion of the catch tongue engages the carrier device in a receiving member of the recess of the carrier device, wherein the receiving member is an aperture cut-out of the recess of the carrier device.

5. The bearing arrangement as claimed in claim 1, wherein the hooked portion has a ramp flank and a flank which is radial with respect to the axis of the sleeve.

6. The bearing arrangement as claimed in claim 1, having a torsion prevention system of the sleeve preventing rotation of said sleeve with respect to the carrier device.

7. The bearing arrangement as claimed in claim 6, wherein the torsion prevention system is an axial rib formed from a periphery of the sleeve and engages a corresponding axial groove of the recess of the carrier device.

8. The bearing arrangement as claimed in claim 1, wherein the sleeve has a stop for abutment against the carrier device on a sleeve periphery.

9. The bearing arrangement as claimed in claim 8, wherein the stop is formed by an annular collar.

10. The bearing arrangement as claimed in claim 1, wherein the carrier device is a carrier portion of a frame of a rear window of a cabriolet roof and the component is a rear window connection rod of a roof rod assembly of the cabriolet roof.

11. The bearing arrangement as claimed in claim 1, in which said peripheral wall of said sleeve includes a cylindrical base portion, and said first catch element and said second catch element extend axially away from said cylindrical base portion.

12. The bearing arrangement as claimed in claim 11, in which said first catch element is peripherally adjacent to said second catch element.

13. The bearing arrangement as claimed in claim 1, including at least two first catch elements, wherein each of said at least two first catch elements flexes independently of said second catch element.

14. The bearing arrangement as claimed in claim 1, including at least two first catch elements and at least two second catch elements, said first and second catch elements being alternately spaced peripherally about said sleeve.

15. The bearing arrangement as claimed in claim 1, in which each first catch element flexes independently of each second catch element.

16. The bearing arrangement as claimed in claim 1, in which said recess is defined by a recess wall extending from an aperture formed in a surface of said carrier device, wherein said recess wall extends away from said surface, and said hooked portion of said catch tongue engages a catch receiving member formed in said recess wall of the carrier device.

17. A bearing arrangement, comprising
a carrier device having a recess defined by a recess wall extending from an aperture formed in a surface of said carrier device, said recess wall extending away from said surface; and
a bearing socket rotatably supporting a component on the carrier device, wherein the bearing socket includes a sleeve having a peripheral wall received through said aperture and into said recess of the carrier device;
a bearing journal of the component received in a space defined by said peripheral wall, wherein the sleeve includes at least a first, inner catch element securing the bearing journal in an axial direction in the sleeve and a second, outer catch element securing the sleeve in an axial direction in the recess of the carrier device, wherein the first catch element is formed from a catch flap forming a portion of the peripheral wall of the sleeve and which has at an end-face end thereof a catch projection engaging an annular groove of the bearing journal, wherein the second catch element is formed from a catch tongue forming a portion of the peripheral wall of the sleeve, said catch tongue having a hooked portion engaging a catch receiving member formed in said recess wall of the carrier device, a slot separating the catch elements such that the catch elements define free ends of the sleeve that can be independently flexed, wherein the bearing journal has at a periphery thereof at least one assembly and disassembly recess extending axially from the groove having a width in a peripheral direction at least substantially corresponding to a width of the catch tongue in a peripheral direction such that the catch tongue may be flexed inwardly into the at least one assembly and disassembly recess when the socket and bearing are inserted in the recess of the carrier device.

18. The bearing arrangement as claimed in claim 17, in which said peripheral wall is cylindrical.

19. A bearing arrangement, comprising
a carrier device having a recess;
a component having a bearing journal having an annular groove and at least one assembly and disassembly recess extending axially from the groove; and
a bearing socket rotatably supporting the component on the carrier device, wherein the bearing socket includes
a sleeve having a peripheral wall defining an inner space for receiving the bearing journal, wherein the sleeve includes at least
a first, inner catch element securing the bearing journal in an axial direction in the sleeve and being formed from a catch flap, forming a portion of the peripheral wall of the sleeve which has, at an end-face end thereof, a catch projection engaging the annular groove of the bearing journal;
a second, outer catch element securing the sleeve in an axial direction in the recess of the carrier device and being formed from a catch tongue, forming a portion of the cylindrical peripheral wall of the sleeve, said catch tongue having a hooked portion engaging the carrier device; and
a slot separating the catch elements such that the catch elements define free ends of the sleeve that can be independently flexed
the at least one assembly and disassembly recess having a width in a peripheral direction at least substantially corresponding to a width of the catch tongue in a peripheral direction such that the catch tongue may be flexed inwardly into the at least one assembly and disassembly recess when the socket and bearing are inserted in the recess of the carrier device.

\* \* \* \* \*